(12) United States Patent
Muldoon

(10) Patent No.: US 6,257,611 B1
(45) Date of Patent: Jul. 10, 2001

(54) LINKAGE MECHANISM FOR A TRAILER STEERING DEVICE

(76) Inventor: Gerald Muldoon, 181 Clonmore Road, Dungannon, County Tyrone, BT71 6HX, Northern Ireland (GB)

( * ) Notice: Subject to any disclaimer, the term of this patent is extended or adjusted under 35 U.S.C. 154(b) by 0 days.

(21) Appl. No.: 09/308,198
(22) PCT Filed: Nov. 14, 1997
(86) PCT No.: PCT/EP97/06402
  § 371 Date: Aug. 24, 1999
  § 102(e) Date: Aug. 24, 1999
(87) PCT Pub. No.: WO98/21082
  PCT Pub. Date: May 22, 1998

(30) Foreign Application Priority Data

Nov. 14, 1996 (GB) .................................................. 9623707

(51) Int. Cl.[7] .................................................. B62D 13/00
(52) U.S. Cl. ........................................ 280/442; 280/446.1
(58) Field of Search ................................ 280/442, 446.1, 280/419, 426, 448; 180/403

(56) References Cited

U.S. PATENT DOCUMENTS

| 4,244,596 | 1/1981 | Chung . | |
|---|---|---|---|
| 4,702,488 | 10/1987 | Baillie . | |
| 5,201,836 | 4/1993 | DeWitt . | |
| 5,536,030 | * 7/1996 | Bettini | 280/426 |
| 6,152,475 | * 11/2000 | Poole | 280/442 |

FOREIGN PATENT DOCUMENTS 0390288   10/1990   (EP) .

* cited by examiner

*Primary Examiner*—Brian L. Johnson
*Assistant Examiner*—Matthew Luby
(74) *Attorney, Agent, or Firm*—Jay H. Maioli

(57) ABSTRACT

The present invention relates to a linkage mechanism (10) for operative association between a fifth wheel on a drive vehicle and at least one pair of steerable rear wheels. The linkage mechanism (10) is arranged so as, in the first phase, to convey rotary movement of the fifth wheel to rotary movement of the at least one pair of rear wheels and, in a second phase, to permit further rotary movement of the fifth wheel substantially without further rotary movement of the at least one pair of rear wheels. The linkage mechanism (10) comprises a pivotable crank (12); a cam roller (24) in operative association with the fifth wheel; and a cam collar (26) in operative association with the crank (12). The invention also relates to a vehicle having at least one pair of steerable rear wheels and incorporating the linkage mechanism (10).

14 Claims, 19 Drawing Sheets

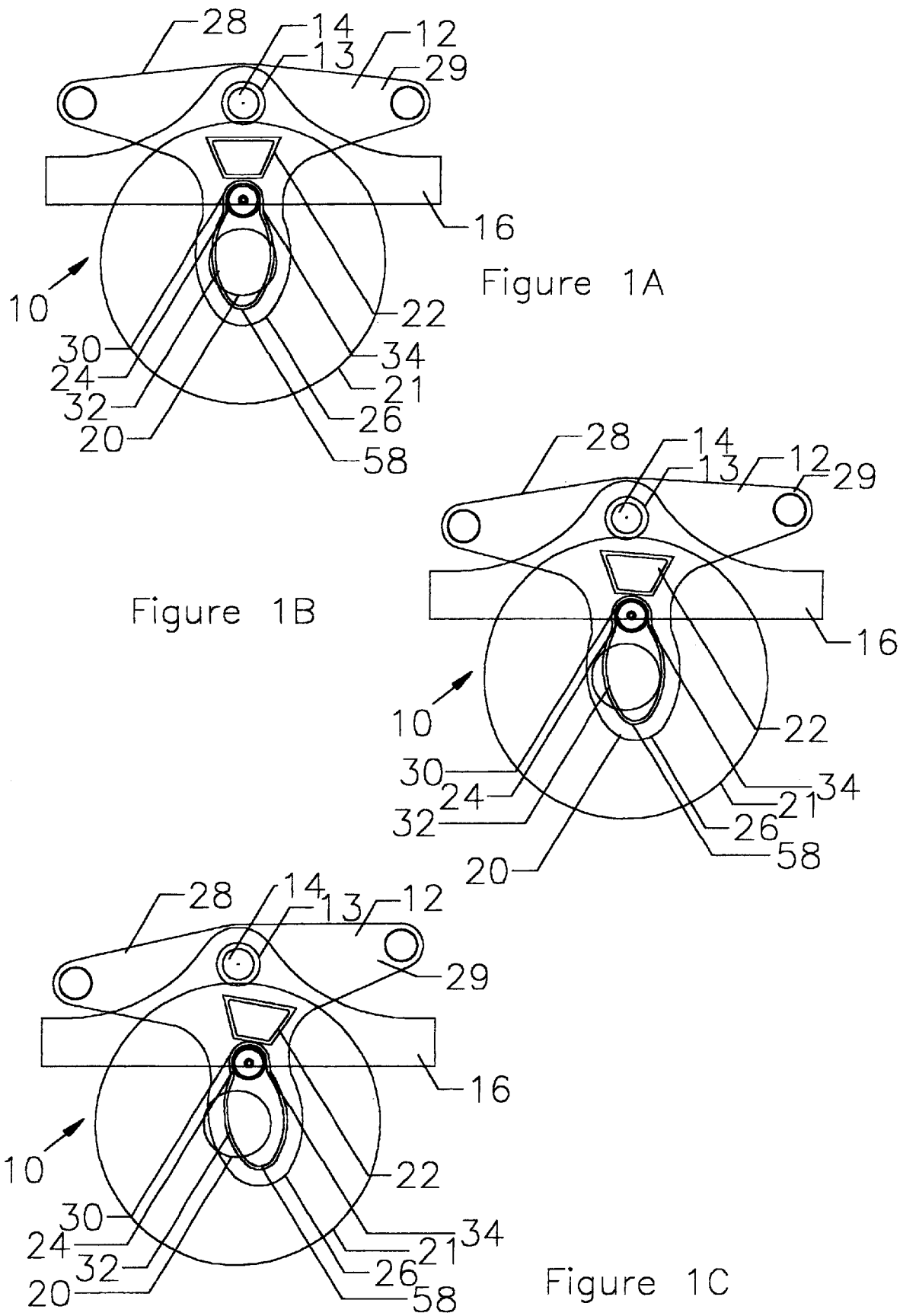

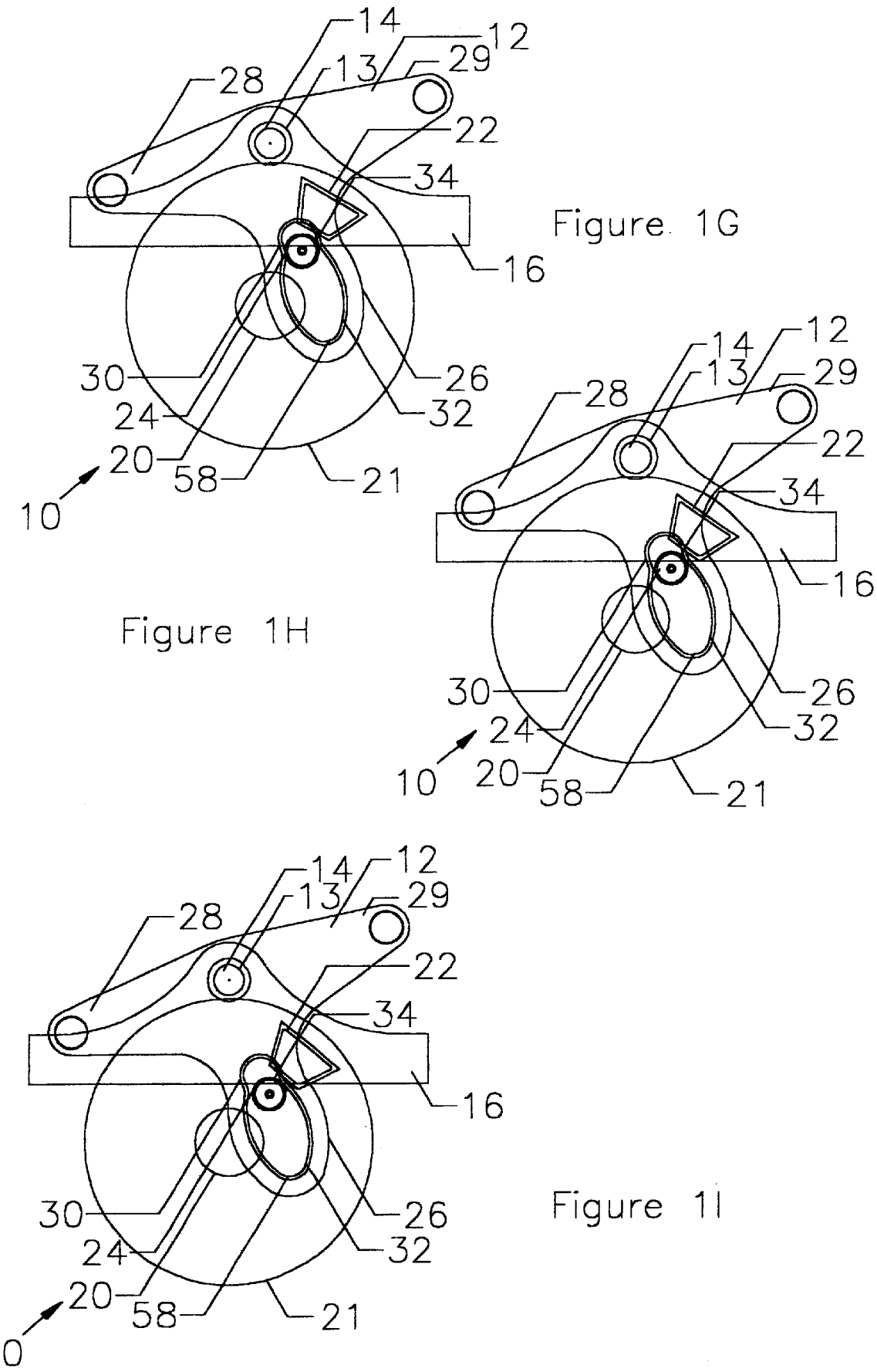

LINKAGE MECHANISM FOR A TRAILER STEERING DEVICE

BACKGROUND OF THE INVENTION

The present invention relates to a linkage mechanism which is suitable for operative association between a fifth wheel of a drive vehicle and a steerable rear axle of, for example, a trailer unit.

The term "steerable rear axle" is intended to embrace a pivotable rear axle/rear wheel assembly, as well as, pivotable rear wheels connected to a rear axle steerable under the influence of a king pin steering system.

U.S. Pat. No. 5,201,836 discloses a steering mechanism comprising a pivotal lever and a pin extending from a fifth wheel. The pin extends through an arcuate slot and then through an elongated slot in the lever. In use, the pin moves along the arcuate slot whilst moving longitudinally in the elongated slot. U.S. Pat. No. 5,201,836 does not disclose or even suggest a cam collar comprising a substantially round section opening into a substantially elliptic section.

SUMMARY OF THE INVENTION

According to a first aspect of the invention there is provided a linkage mechanism for operative association between a fifth wheel of a drive vehicle and at least one pair of steerable rear wheels, the linkage mechanism comprising a pivotable crank; a cam roller in operative association with the fifth wheel; and a cam collar in operative association with the crank, the linkage mechanism being arranged so as, in a first phase, to convey rotary movement of the fifth wheel to steering movement of the at least one pair of rear wheels and, in a second phase, to permit further rotary movement of the fifth wheel substantially without further steering movement of the at least one pair of rear wheels, characterised in that the cam collar comprises a substantially obround section opening into a substantially elliptic section and the cam roller engages against the obround section in the phase and against the elliptic section in the second phase.

Preferably, a stop means is arranged to substantially prevent further pivotable movement of the crank in the second phase.

Advantageously, the crank and the cam collar form a unitary bell crank.

Even more advantageously, the bell crank is substantially "T"-shaped.

According to a second aspect of the invention there is provided a vehicle having at least one pair of steerable rear wheels and incorporating a linkage mechanism according to a first aspect of the invention.

Preferably, the vehicle comprises a drive vehicle and trailer unit assembly, the trailer unit having the at least one pair of the steerable rear wheels.

The term "trailer unit" is intended to embrace semi-trailers.

Preferably, pivotable movement of the crank is conveyed to the at least one pair of steerable rear wheels by a hydraulic means.

More preferably, the bell crank is substantially "L"-shaped and the hydraulic means comprises a master hydraulic cylinder in fluid communication with a slave hydraulic cylinder.

Advantageously, the bell crank is substantially "T"-shaped and the hydraulic means comprises two master cylinders, each in fluid communication with a respective slave cylinder.

Alternatively, pivotable movement of the crank is conveyed to the at least one pair of steerable rear wheels by a mechanical means.

Preferably, the mechanical means comprises linkage rods or wire ropes.

BRIEF DESCRIPTION OF THE INVENTION

Two embodiments of the invention will now be described, by way of example, with reference to the accompanying drawings, in which:

FIGS. 1a–i show schematic plan views of a linkage mechanism according to a first aspect of the invention;

FIGS. 2a, 3a, 4a and 5a each show a first embodiment of a drive vehicle/trailer unit assembly according to a second aspect of the invention, incorporating a linkage mechanism according to a first aspect of the invention, in which the drive vehicle is at 0°, 20°, 40° and 70°, respectively, relative to the trailer unit;

FIGS. 2b, 3b, 4b and 5b each show an enlarged view of the linkage mechanism of FIGS. 2a, 3a, 4a and 5a, respectively;

FIG. 6b is a schematic view of a hydraulic circuit for the linkage mechanism of FIGS. 1–5 and of FIG. 6a;

FIG. 8 is an exploded view of a front turntable assembly of the linkage mechanism of FIG. 6a;

FIG. 9 is an exploded view of a crank assembly of the linkage mechanism of FIG. 6a;

In the drawings, similar reference numerals have been used to indicate like parts.

DETAILED DESCRIPTION OF THE INVENTION

Figures 1D, 1E, 1F:
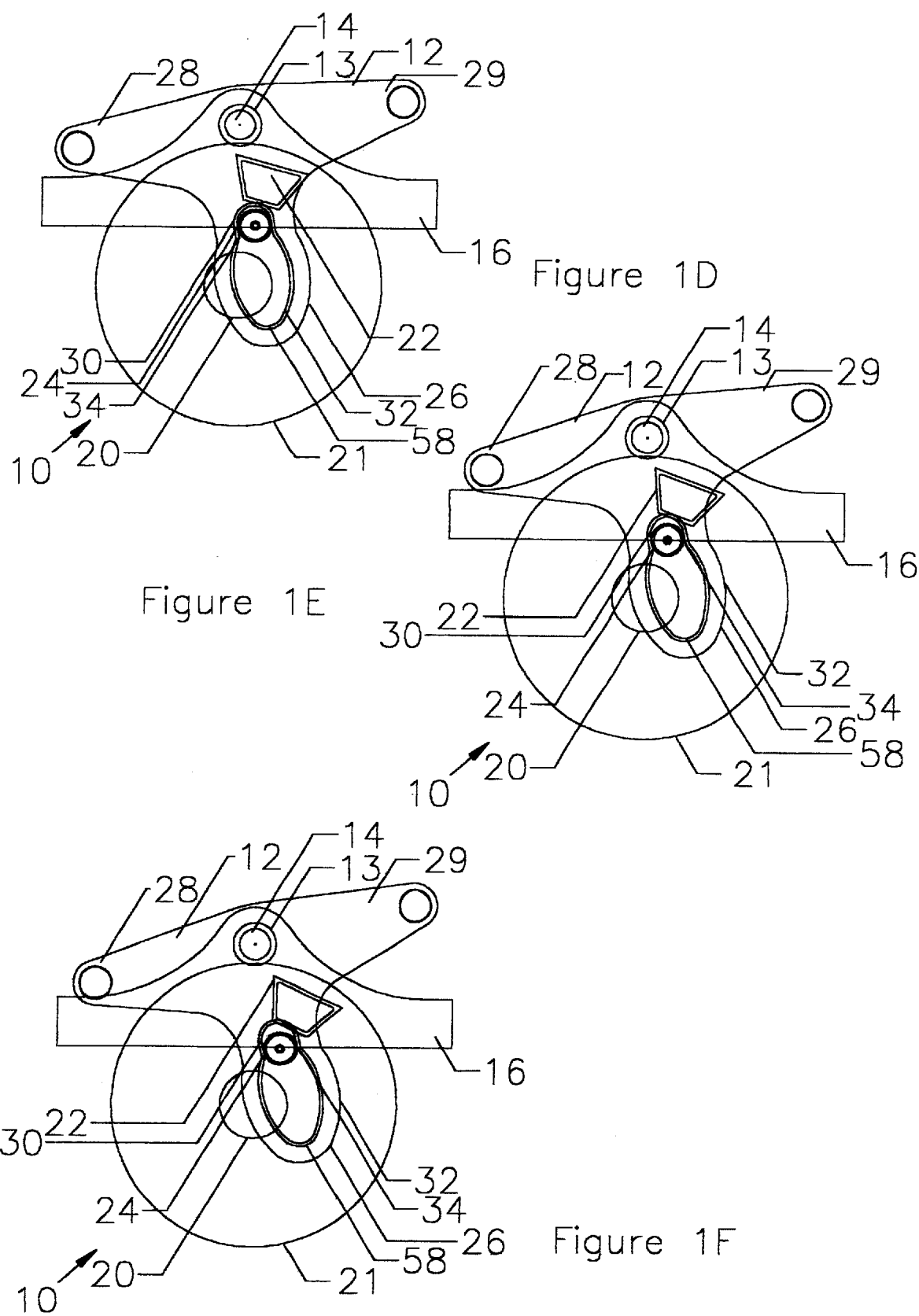

Referring to FIGS. 1a–i of the accompanying drawings, there is schematically illustrated a first embodiment of a linkage mechanism according to a first aspect of the invention, generally indicated as 10.

The linkage mechanism 10 comprises a crank 12 pivotable about a pin 14, which pin 14 extends between a sandwich support bracket 16. The support bracket 16 is fixedly mounted to the chassis of a trailer unit 40 (not shown). A bush 13 is provided, which may be a vulcanised rubberised bush to permit absorption of force changes.

A fifth wheel 18 (shown in FIGS. 2b, 3b, 4b, 5b), which is rotatable under the influence of a king pin 20 of a drive vehicle's steering system, is provided on a drive vehicle (not shown in FIGS. 1a–i). The fifth wheel 18 is provided with a wedge-shaped socket 23 (shown in FIGS. 2b, 3b, 4, 5b), to receive a wedge-shaped member 22, extending from the trailer unit (not shown in FIGS. 1a–i).

A cam roller 24 is in operative association with the fifth wheel 18 and is in operative association with the crank 12. Specifically, the cam roller 24 and the wedge-shaped member 22 are connected by a turntable 21.

The crank 12, which is a unitary bell crank, is substantially "T"-shaped and incorporates a cam collar 26 and transversely extending arms 28,29. In use, distal ends of the arms 28,29 are operatively associated with a steerable rear axle (not shown in FIGS. 1a–i).

The cam collar 26 includes a substantially obround section 30 which opens into a substantially elliptic section 32. The longitudinal walls of the obround section 30 are substantially parallel to each other and the longitudinal walls provide a running clearance for the cam roller 24 (see FIGS. 1a–1i).

In FIG. 1a, the linkage mechanism 10 is in the straight-ahead position, so that the longitudinal axis of the drive vehicle is at $0°$ relative to the longitudinal axis of the trailer unit. In this position, the cam roller 24 is centrally located in the obround section 30 and the longitudinal axis of the arms 28,29 is parallel to the longitudinal axis of the bracket 16 (indicated as datum line in FIGS. 1a–i).

As the drive vehicle is steered 5° to the left, the fifth wheel 18 moves in a clockwise direction. The cam roller 24 is forced against the right-hand longitudinal wall of the obround section 30, thereby causing counter-clockwise pivotable movement of the crank 12 (see FIG. 1b).

If the drive vehicle is steered 10° to the left (see FIG. 1c), the cam roller 24 continues to engage against the obround section 30 and causes further pivotable movement in a counter-clockwise direction of the crank 12.

Similarly, still further clockwise movement of the fifth wheel 18, 10°, 15°, 20°, 25°, 30°, 35° beyond straight-ahead causes the cam roller 24 to further engage against the obround section 30 of the cam collar 26, thereby causing further counter-clockwise pivotable movement of the crank 12 (see FIGS. 1c–1h).

As the fifth wheel 18 is rotated 400 from straight-ahead (see FIG. 1i), the cam roller 24 engages against a radius junction 34 between the obround section 30 and the elliptic section 32 of the cam collar 26. When the cam roller 24 enters the elliptic section 32, the first phase, in which rotary movement of the fifth wheel 18 is conveyed to the steerable rear axle (not shown), is completed. Thus, FIGS. 1a–i illustrate the first phase in which rotary movement of the fifth wheel (from straight ahead to 40° from straight ahead in the first embodiment) is conveyed to a steerable rear axle. The shape of the obround section 30 is chosen to increase the steering angle of the rear axle 42 up to a maximum of 25° from straight-ahead, in either direction.

Figure 2A:
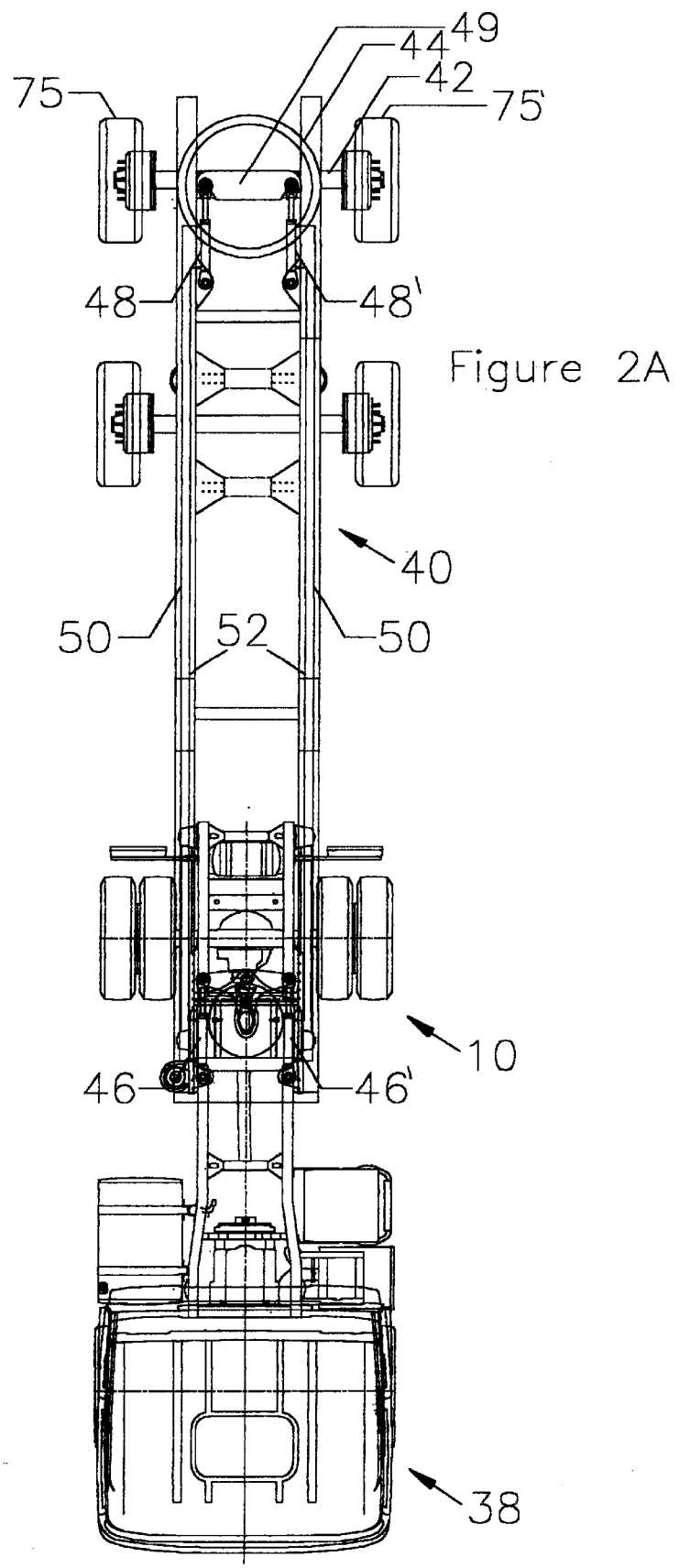
Figure 2B:
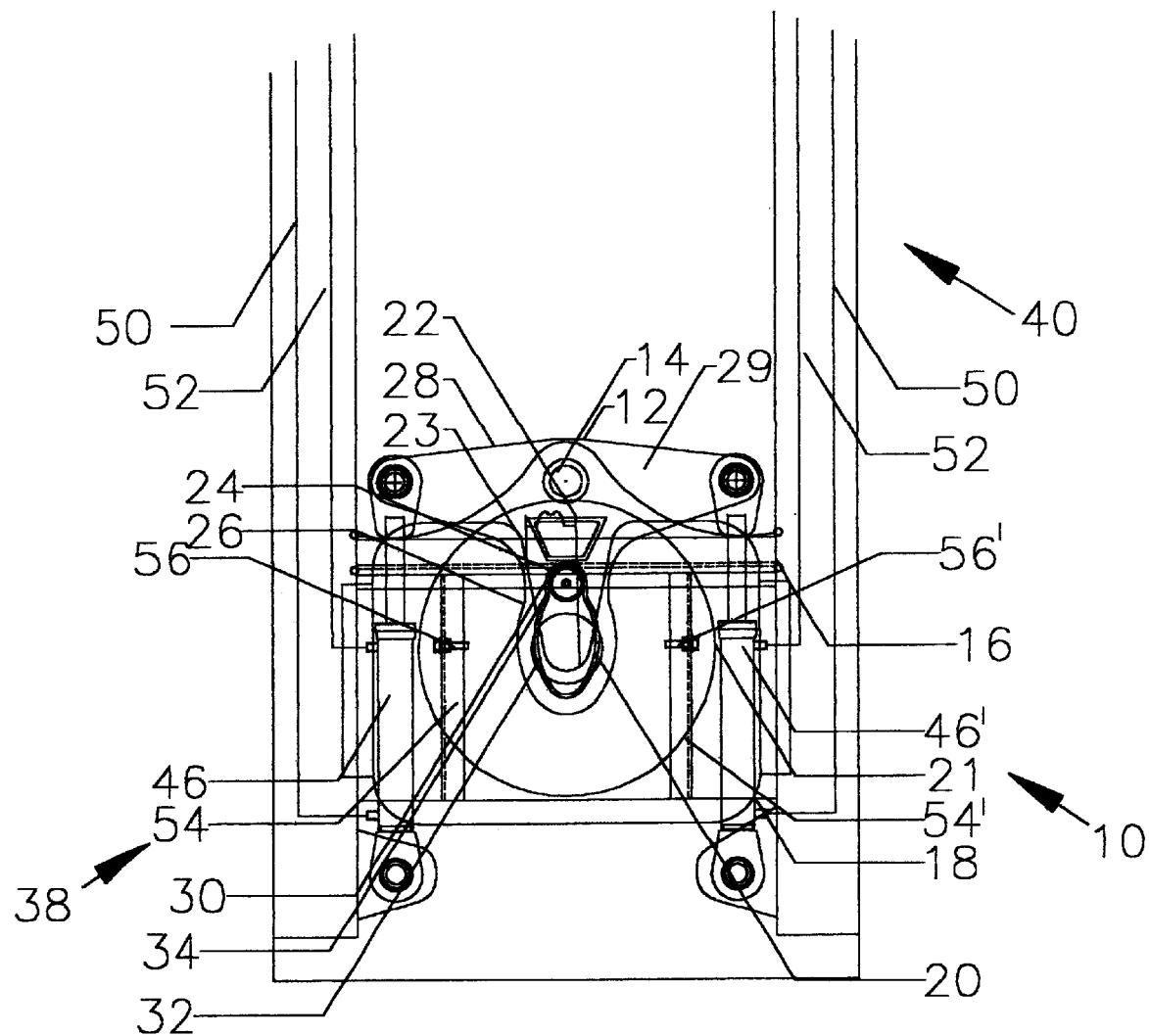

Referring now to FIGS. 2a and 2b of the accompanying drawings, there is illustrated a drive vehicle 38/trailer unit 40 assembly having a steerable rear axle 42. A pivotable rear turntable 44 is provided in operative association with the rear axle 42. However, the rear axle 42 may, alternatively, be steerable in any conventional manner, for example, a bogie or king pin system as illustrated in the second embodiment of the drive vehicle/trailer unit assembly (see FIGS. 11–13).

In the present embodiment, the distal ends of the transverse arms 28, 29 are in hydraulic communication with a top plate of a bogie assembly.

The hydraulic communication comprises a pair of master cylinders 46, 46' in fluid communication with a pair of slave cylinders 48, 48' by means of hydraulic inflow and outflow piping 50, 52, respectively. The rods of the respective master cylinders 46, 46' are connected by spherical bearings (not shown) to the distal ends of the arms 28, 29, thereby permitting conversion of the rotatable movement of the crank 12 into reciprocal movement of hydraulic fluid. This causes reciprocal movement of the rods of the slave cylinders 48, 48' which are, in turn, converted into pivotable movement of the steerable rear axle 42. Specifically, the respective rods of the slave cylinders 48,48' are pivotably connected adjacent respective free ends of a sandwich top plate. A lateral cross member (of substantially C-shape) rigidly connects the free ends of the top plate with a bogie, which bogie is in turn rigidly connected to the rear axle 42. The assembly of a top plate/lateral cross member/bogie form a conventional bogie assembly whereby pivotable movement of the top plate is converted into pivotable movement of the rear axle.

It will be appreciated that the use of a hydraulic communication means allows complete freedom in the mechanical design of trailer chassis and, specifically, may be fitted readily in step-trailers.

The use of parallel master and slave cylinders 46, 46', 48, 48', is preferred for safety reasons. However, the trailer unit 40 would still be steerable if only one of the pair of master/slave cylinder combinations were operational.

It will also be appreciated that the hydraulic communication means may be replaced by mechanical means such as, for example, linkage rods or wire ropes (not shown).

A pair of lateral brackets 54, 54' extend substantially perpendicularly from the support bracket 16 and serve to locate a pair of stop means 56, 56'.

As is illustrated more clearly in FIG. 2b of the accompanying drawings, a wedge-shaped socket 23 is provided on the fifth wheel 18, to receive the wedge-shaped member 22 extending from the trailer unit 40.

When the drive vehicle 38/trailer unit 40 assembly is in the straight-ahead position, the cam roller 24 is centrally located in the obround section 30 of the cam collar 26, as also illustrated in FIG. 1a.

Figure 3A:
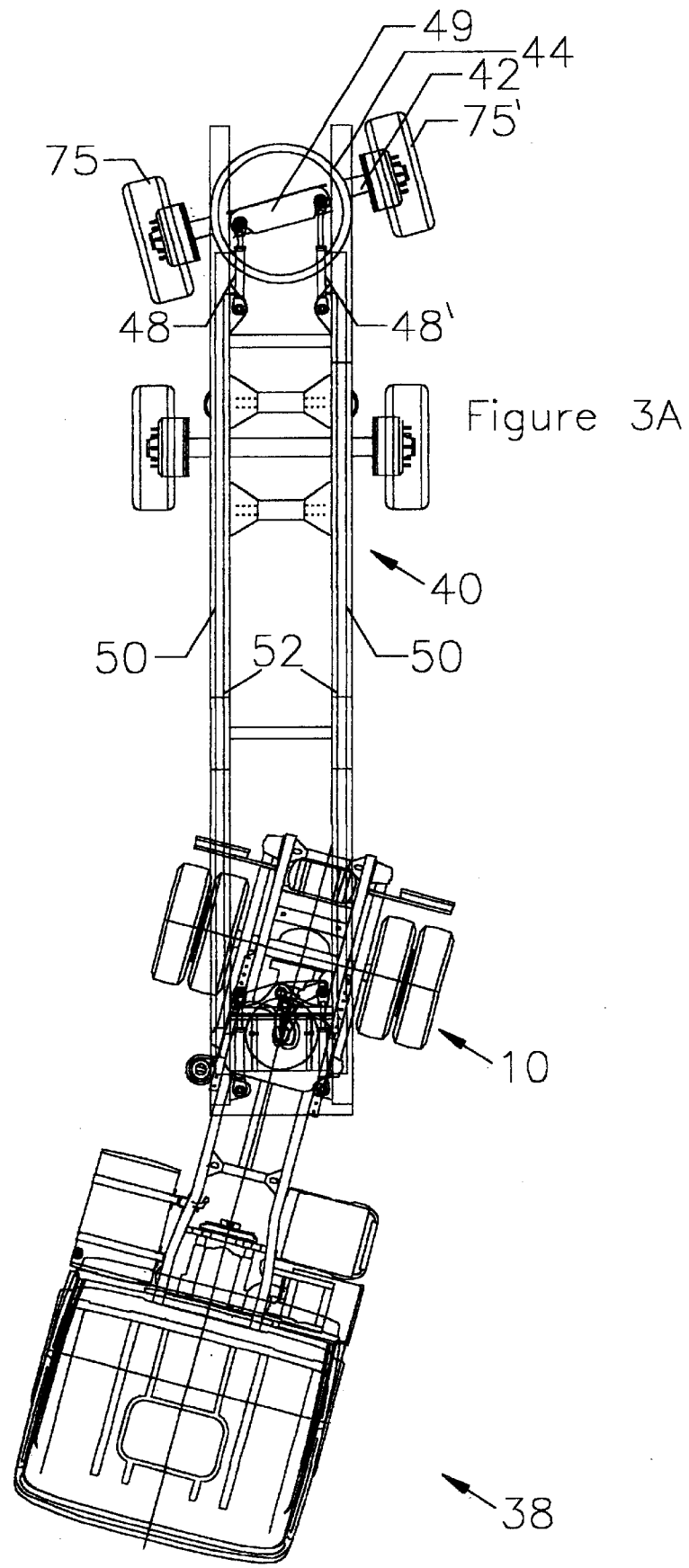
Figure 3B:
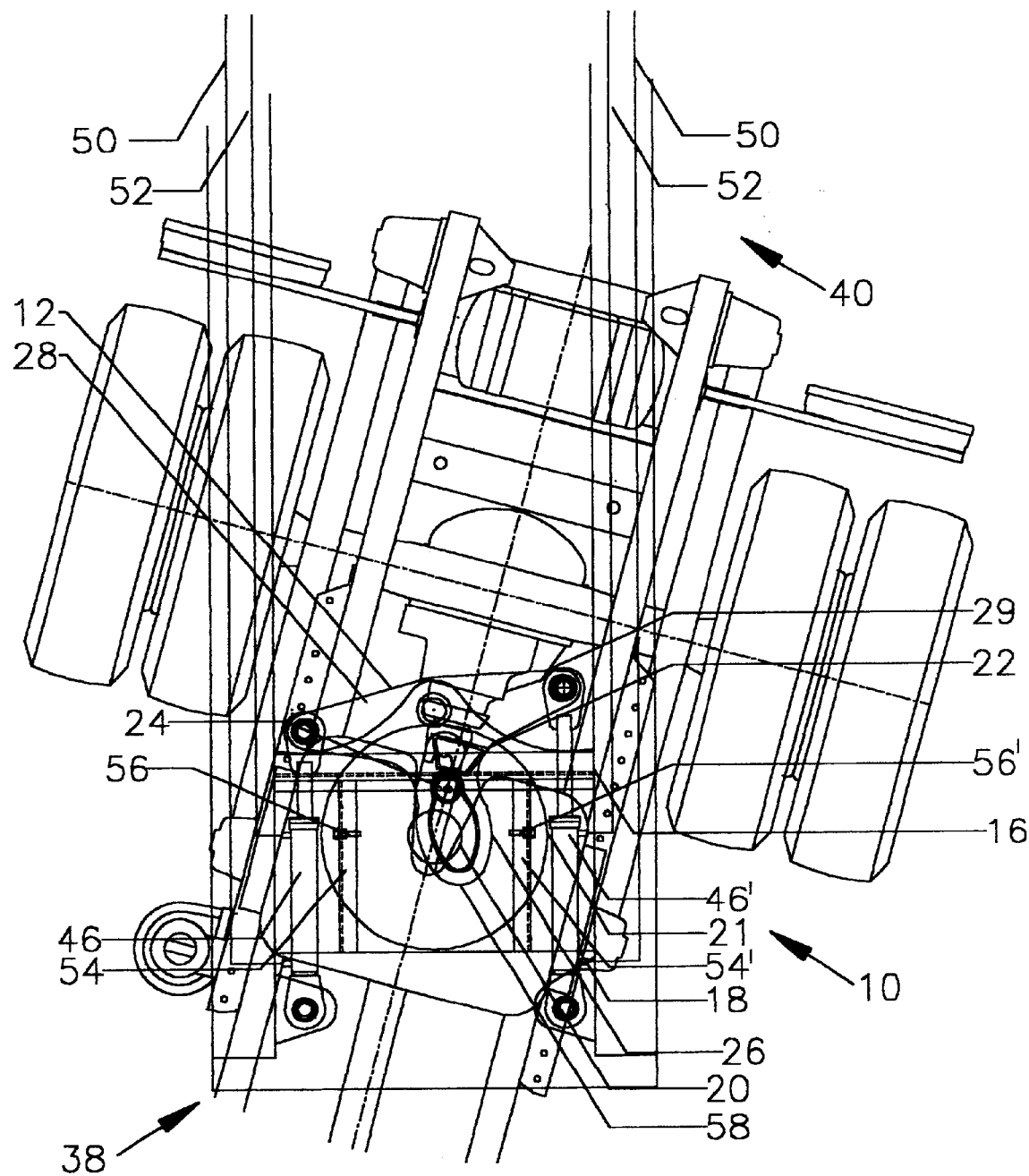

Turning now to FIGS. 3a and 3b of the accompanying drawings, the drive vehicle 38 is at a 20° relative to the trailer unit 40, as also illustrated in FIG. 1e. As will be observed more clearly from FIG. 3b, the cam roller 24 has engaged against the right-hand surface of the obround section 30 of the cam collar 26. This has caused the crank 12 to pivot in a counter-clockwise direction. This reciprocal movement has been conveyed to the steerable rear axle 42 by means of the hydraulic communication means and has caused the rear axle 42 to pivot in a counter-clockwise direction through an angle of about 14.9° relative to the trailer unit 40.

Figure 4A:
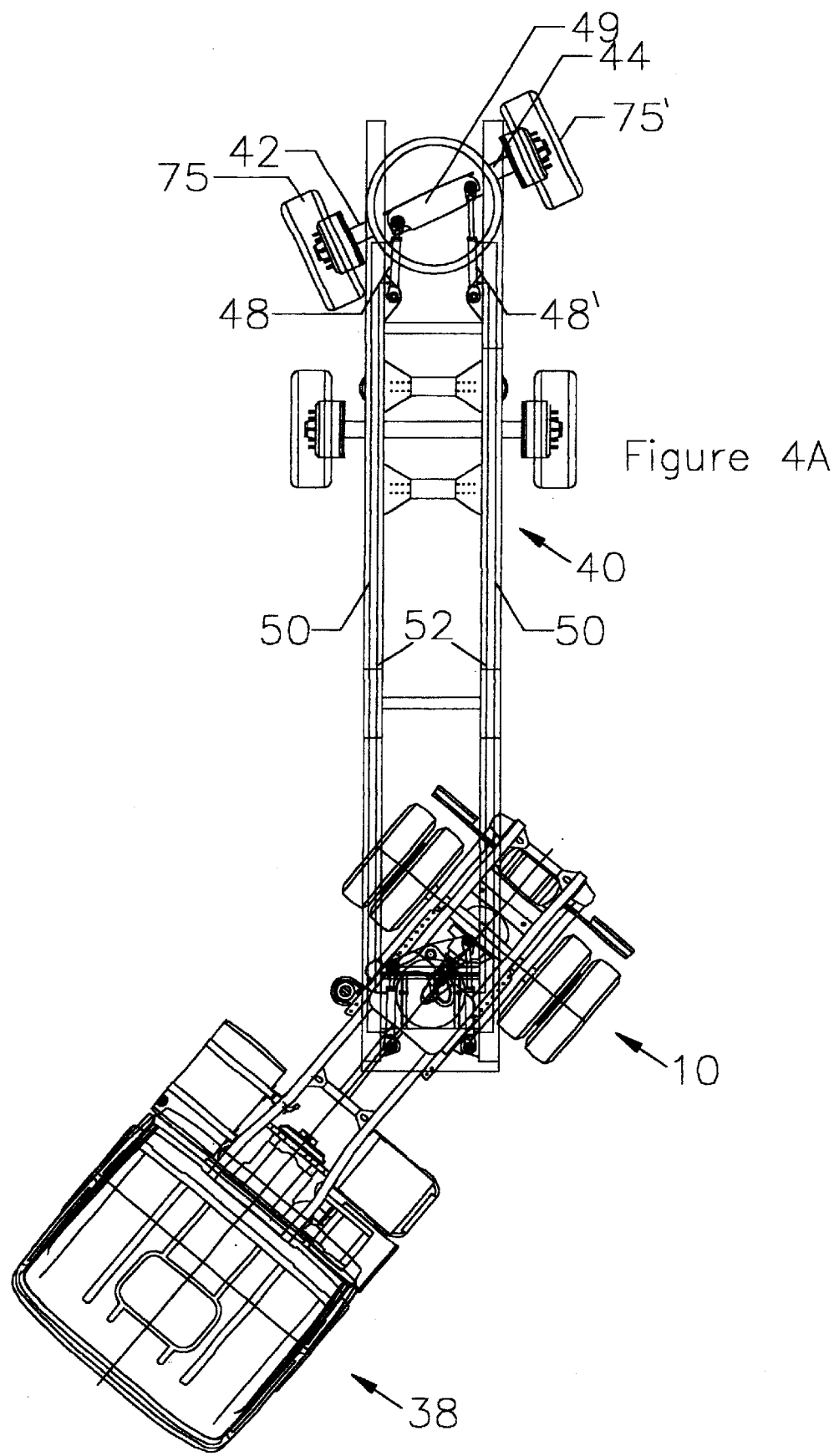
Figure 4B:
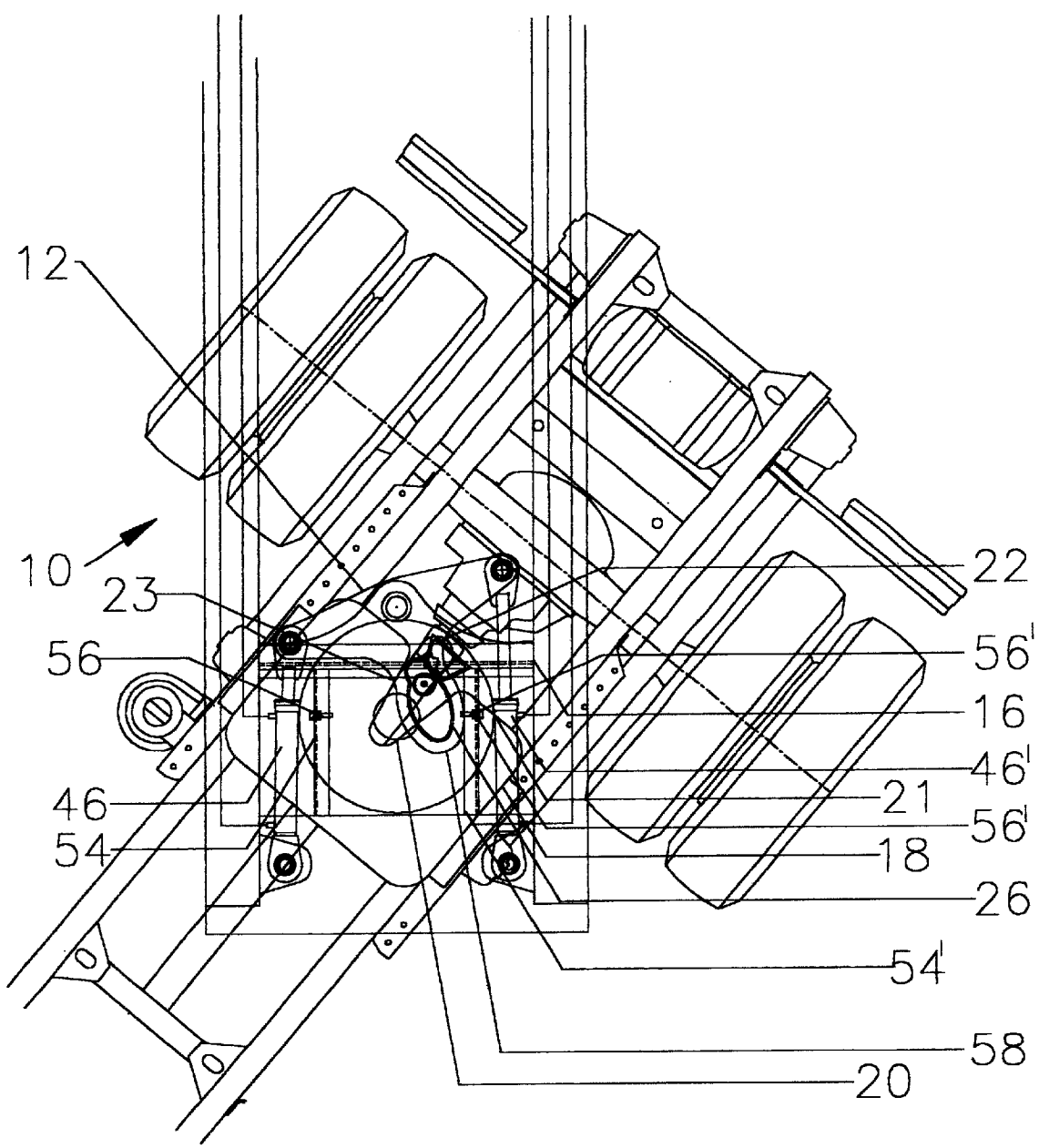

Turning now to FIGS. 4a and 4b, the drive vehicle 38 is at an angle of 40° relative to the trailer unit 40, as also illustrated in FIG. 1i. As will be observed more clearly from FIG. 4b, this causes the cam roller 24 to engage against the junction 34 between the obround section 30 and the elliptic section 32 and causes the cam collar 26 to engage against the stop means 56'. At this point, the first phase, in which rotary movement of the fifth wheel 18 is conveyed to rotary movement of the rear axle 42, is now completed. At this point, the rear axle 42 has been pivoted in a counter-clockwise manner through an angle of about 25° relative to the trailer unit 40.

It will be appreciated that, during the first phase, pivotable movement of the cam collar 26 is confined between opposing longitudinal walls of the obround section 30. This restricts the pivotable "play" on the crank 12 and, therefore, on the rear axle 42. This serves as an important safety feature.

Figure 5A:
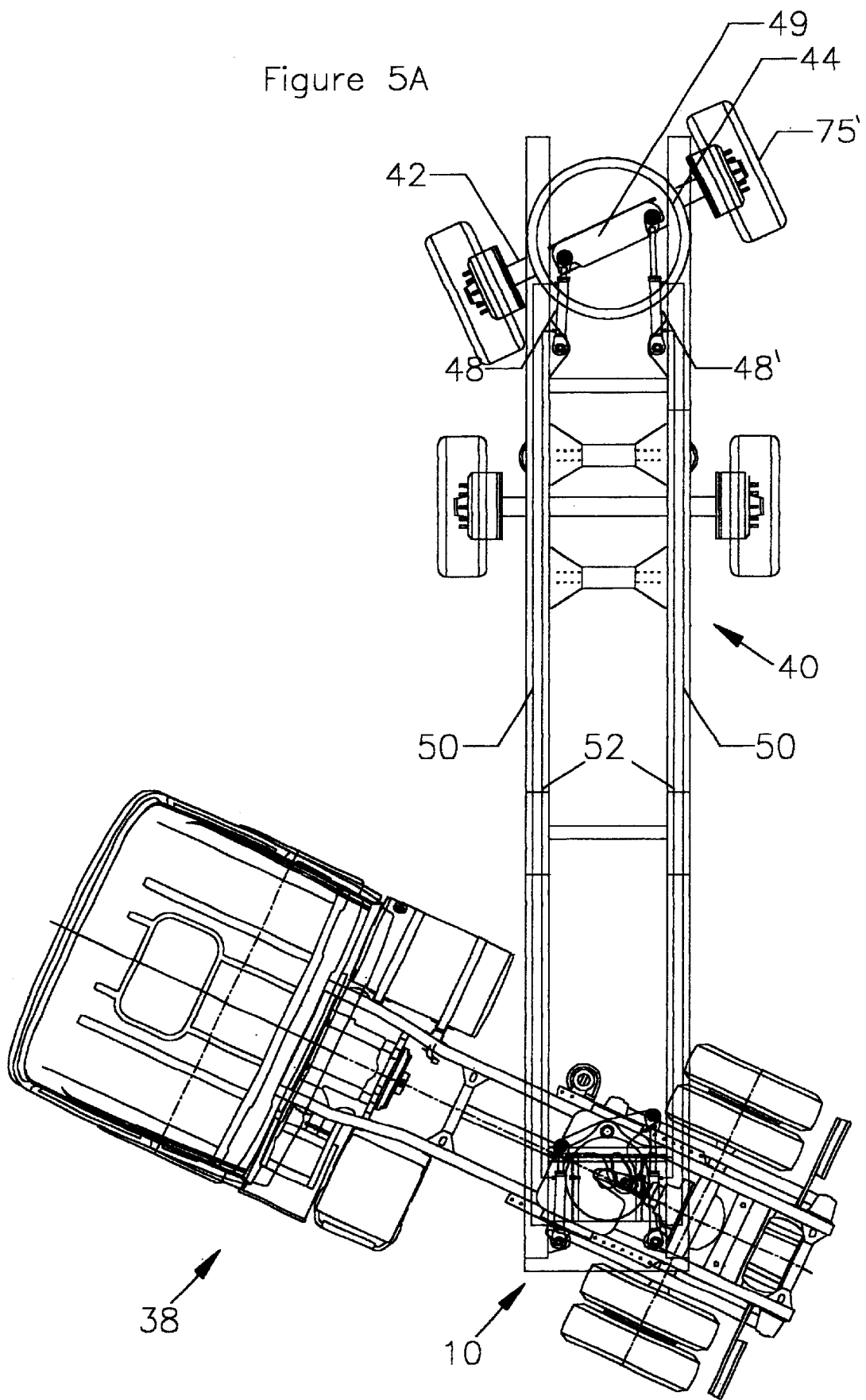
Figure 5B:
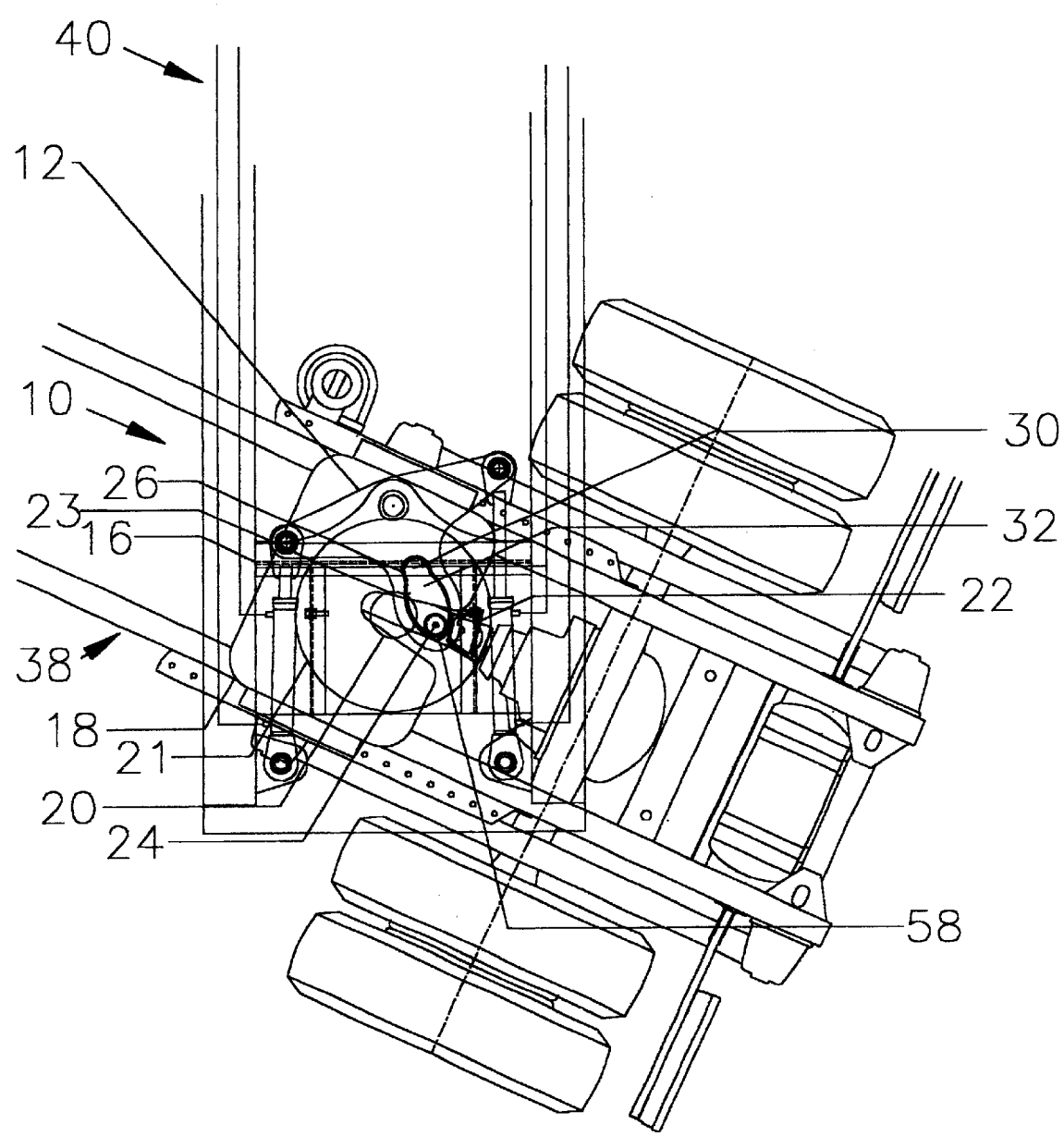

Turning now to FIGS. 5a and 5b, the drive vehicle 38 has been jack-knifed relative to the trailer unit 40. In this position, the drive vehicle 38 is at an angle of 70° relative to the trailer unit 40. In this position, the cam roller 24 has reached the distal apex 58 of the elliptic section 32 and the rear axle 42 remains pivoted in a counter-clockwise manner at an angle of about 27.9° relative to the trailer unit 40.

During the second phase, the cam collar 26 is confined between the cam roller 24 and the stop means 56' which restricts pivotable "play" on the crank 12 and, therefore, on the rear axle 42. This again serves as an important safety feature.

It will be appreciated that movement of the cam roller 24 between the junction 34 and the distal apex 58 of the elliptic section 32, comprises the second phase, in which further rotary movement of the fifth wheel 18 (from 40° to 70° in the present embodiment) occurs substantially without further rotary movement of the rear axle 42 (from 25° to 27.9° in the present embodiment).

It will also be appreciated that the relative durations of the first and second phases can be altered as desired, by altering the geometric proportions of the obround section 30 and the elliptic section 32.

It will further be appreciated that transmission of the rotary movement of the fifth wheel 18 to the rear axle 42 can also be varied by altering the length, for example, of the transverse arms 28, 29 and/or by altering the distance between the points of connection of the slave cylinders 48, 48', with the top plate 49 in conventional manner.

It is preferred that variation of transmission of the rotary movement of the fifth wheel 18 to the rear axle 42 is achieved by altering the distance between the points of connection of the slave cylinders 48,48' with the top plate 49. For example, if the distance between the points of contact of the slave cylinders 48,48' vis-à-vis the top plate 49 is increased to 711 mm, the first phase is completed when the rear axle 42 has been pivoted through an angle of 21° relative to the trailer unit 40. Such a first phase maximum steer angle of 21° is suitable for a conventional 1200 mm wide chassis incorporating longitudinal substantially "I"-shaped members having a 130 mm wide flange.

If the distance between the points of contact of the slave cylinders 48,48' with the top plate 49 is further increased to 876 mm, a maximum first phase steer angle of 19° is observed. This is suitable for a conventional 1200 mm wide chassis incorporating longitudinal substantially "I"-shaped members having a 170 mm wide flange. Such substantially "I"-shaped members having a 130 mm or 170 mm wide flange are usually formed from steel or aluminum, respectively.

The above-mentioned first phase maximum steer angles of 21° and 19° are preferred over the original maximum steer angle of 25° only because the latter can only be achieved with a narrower than normal chassis, whereas the former can be achieved with a conventional chassis width.

Referring now to FIGS. 6a, 6b, and 7–10 of the accompanying drawings, there is illustrated a second embodiment of a linkage mechanism according to the present invention, generally indicated as 110.

The linkage mechanism 110 differs from the linkage mechanism 10 only in the orientation of the master cylinders 46,46'/146,146'. In the first embodiment, the master cylinders 46,46' are arranged forwardly of the support bracket 16 whereas, in the second embodiment, the master cylinders 146,146' are arranged rearwardly of the support bracket 116. It will of course be appreciated that the orientation of the master cylinders has no effect on the workings of the hydraulic communication means.

Figure 6A:
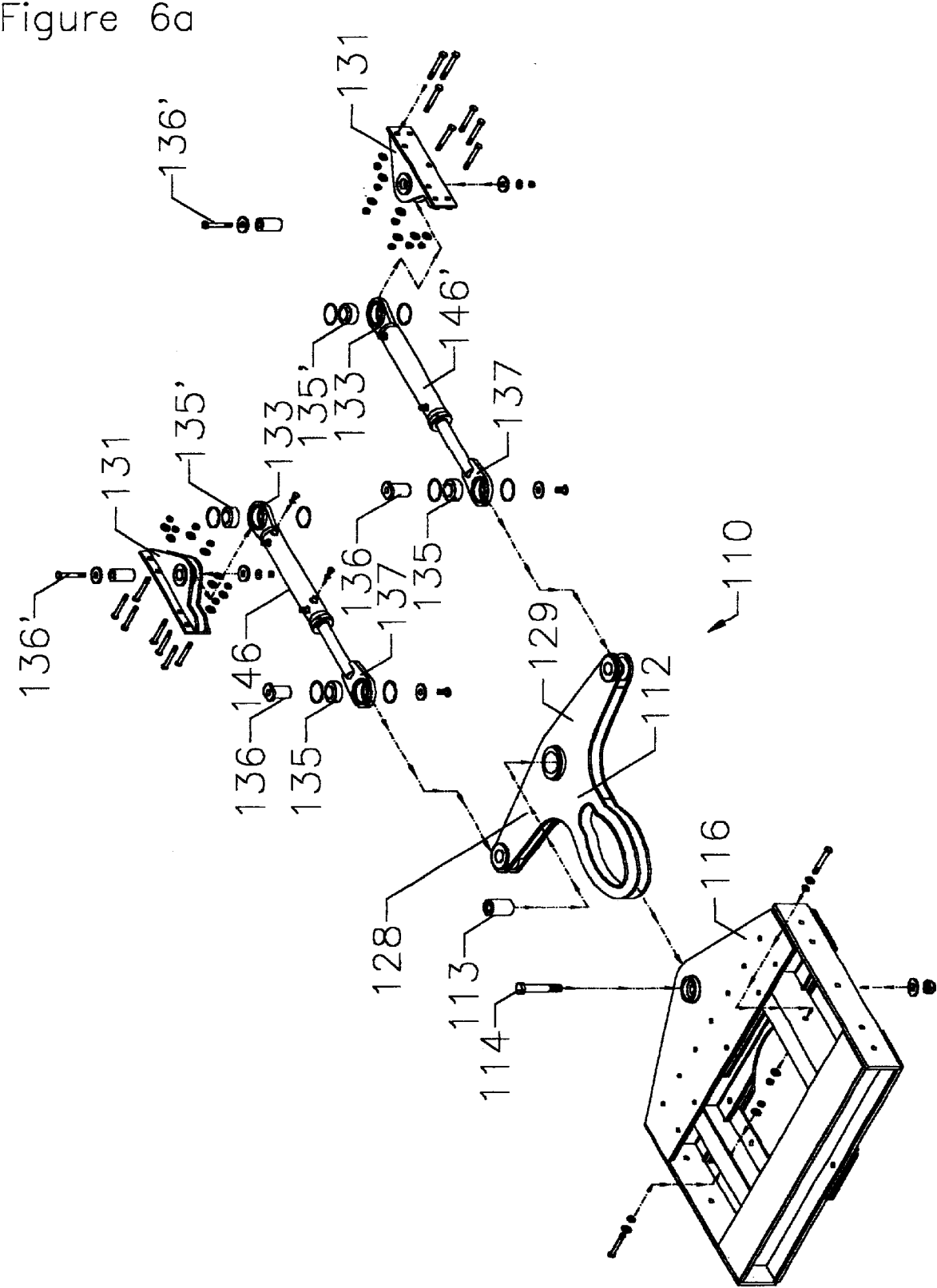
FIG. 6a is an exploded perspective view of a second embodiment of a linkage mechanism according to the invention.
Figure 7:
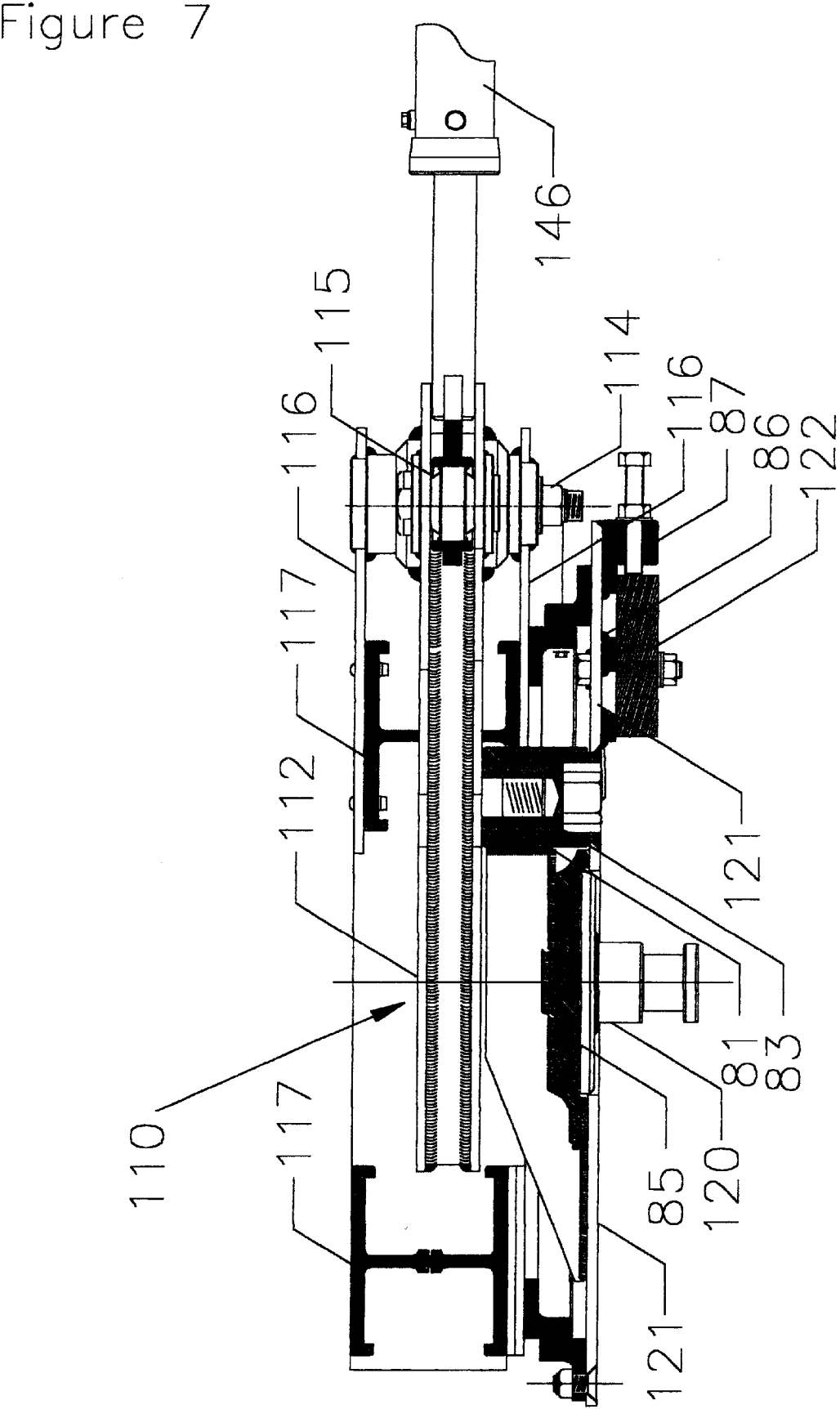
FIG. 7 is a longitudinal vertical staggered-sectional view through a distal end of a transverse arm of a linkage mechanism according to a first aspect of the invention.

Referring to FIGS. 6a and 7, the rod end anchor 137 of each master cylinder 146,146' is connected to the distal ends of the respective arms 128,129 in the following manner. The respective rod end anchor 137 houses a spherical bearing 135/pin 136 arrangement. The respective cylinder end anchors 133 are similarly connected to lateral brackets 131 by a spherical bearing 135'/pin 136' arrangement. The lateral brackets 131 are rigidly mounted on the chassis of the trailer unit 140.

Figure 6B:
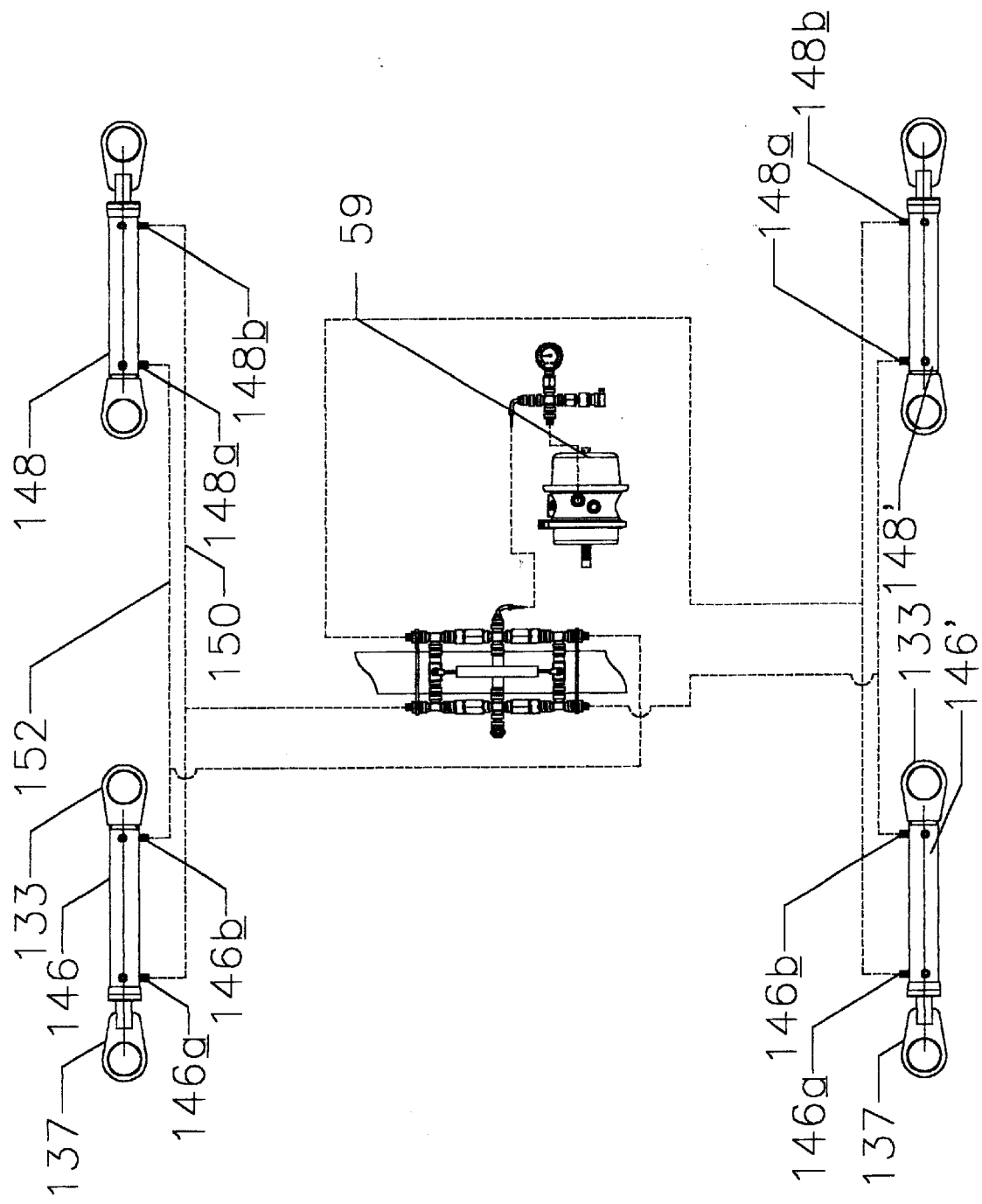

Referring to FIG. 6b, a hydraulic communication means is shown. As the cam roller 124 rotates about the king pin 120, displacement of the crank 112 ensues. Since the crank 112 is connected to the respective master cylinders 146,146', one of the master cylinders compresses and the other of the master cylinders extends. As the one master cylinder depresses, oil is directed through the outflow piping 152 to a base 148a of the slave cylinder 148. This causes the rod 66 to extend from the slave cylinder 148, which, in turn causes oil to be forced out of 148b, through the inflow piping 150 to port 146a on the master cylinder 146. Whilst this is taking place, the opposite reaction is taking place in the other of the pair of master/slave cylinder combinations. Circuit pressure is constantly maintained at 5 bar (75 p.s.i.) by the use of a spring activated accumulator 59.

FIG. 7 illustrates the method of connecting the respective rod end anchors 137 of the master cylinders 146,146' to the distal ends of the transverse arms 128,129 of the crank 112. The rod end anchor 137 houses a spherical bearing 135/pin 136 arrangement.

The support bracket 16 is mixedly mounted to each end of a substantially I-shaped cross member 117 which is, in turn, rigidly mounted to the chassis of a trailer unit 40.

Figure 8:
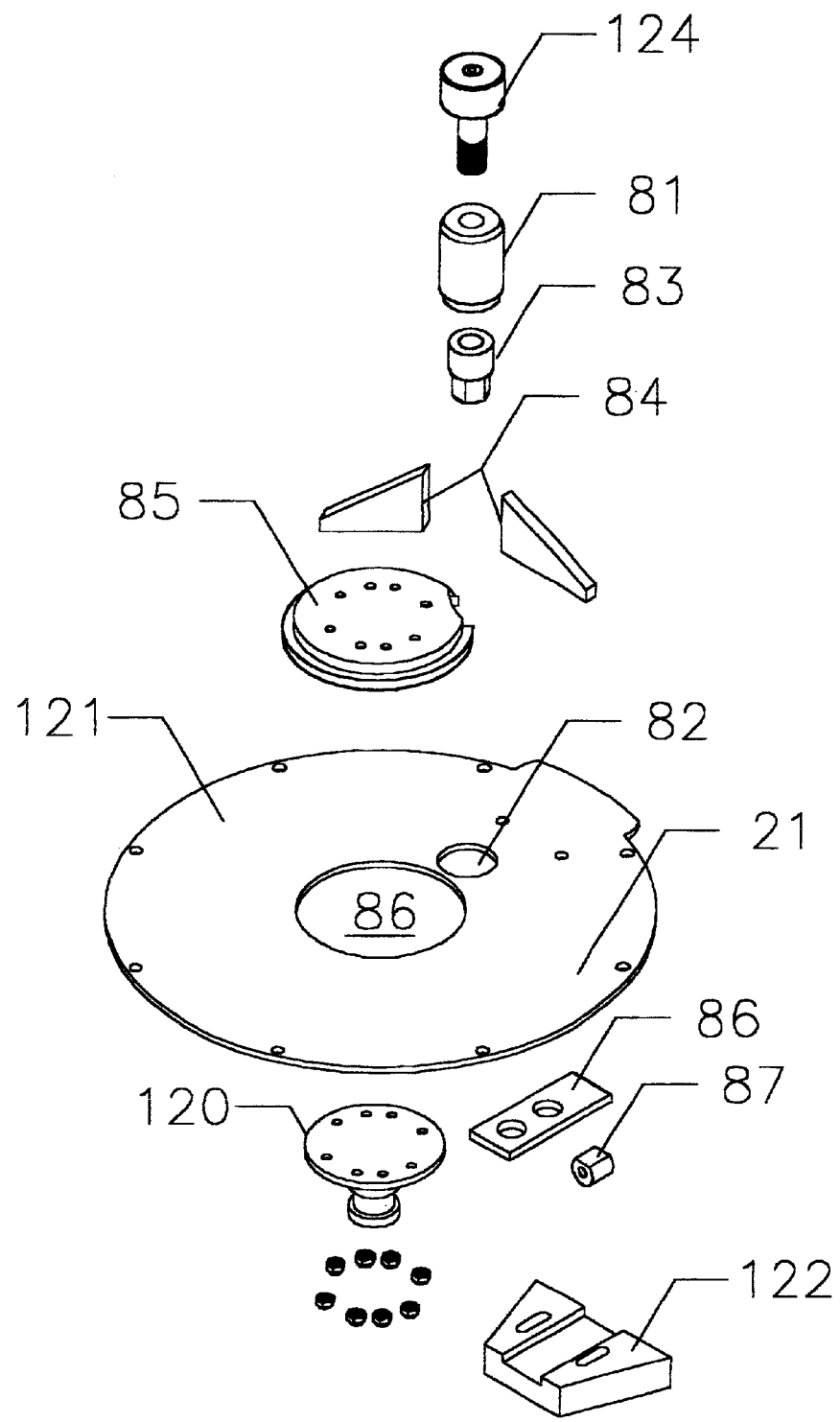

FIG. 8 illustrates a front turntable assembly generally indicated as 80. The assembly 80, which can also be seen in FIG. 7 in section, includes the cam roller 124, a cam roller bush 81 located in an aperture 82, a cam roller retaining nut 83 and side gussets 84.

The assembly 80 also includes a king pin flange 85 located in a central aperture 86 of the front turntable 121, for the king pin 120. A wedge guide 86 and adjusting boss 87 is provided, for engagement with the wedge 122.

Figure 9:
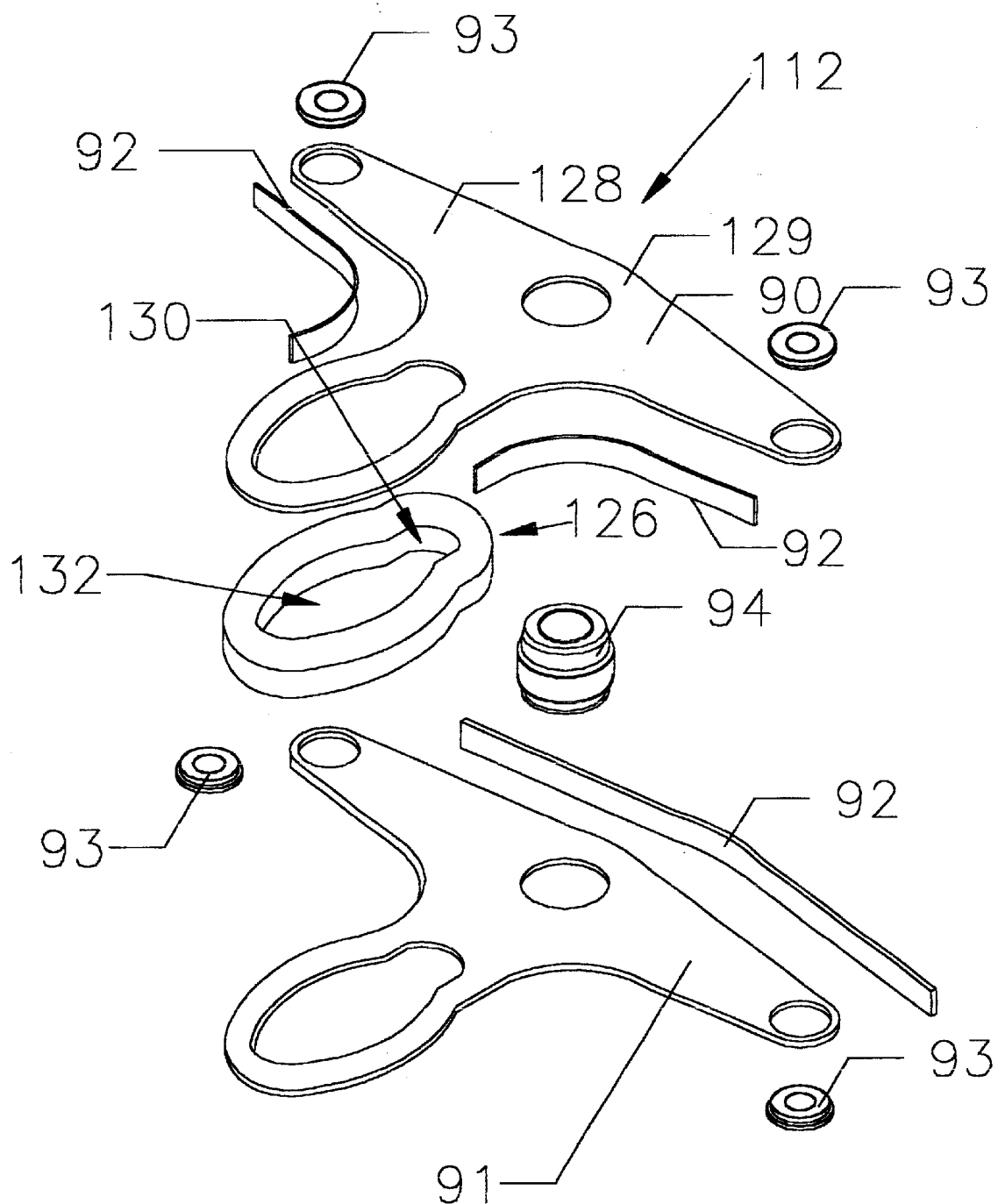

FIG. 9 illustrates the crank 112. The crank 112 is formed from first and second spaced-apart plate members 90,91; spacing members 92; the cam collar 126, as well as respective pin bushes 93 and a bush housing 94 for the bush 113 (not shown).

Figure 10:
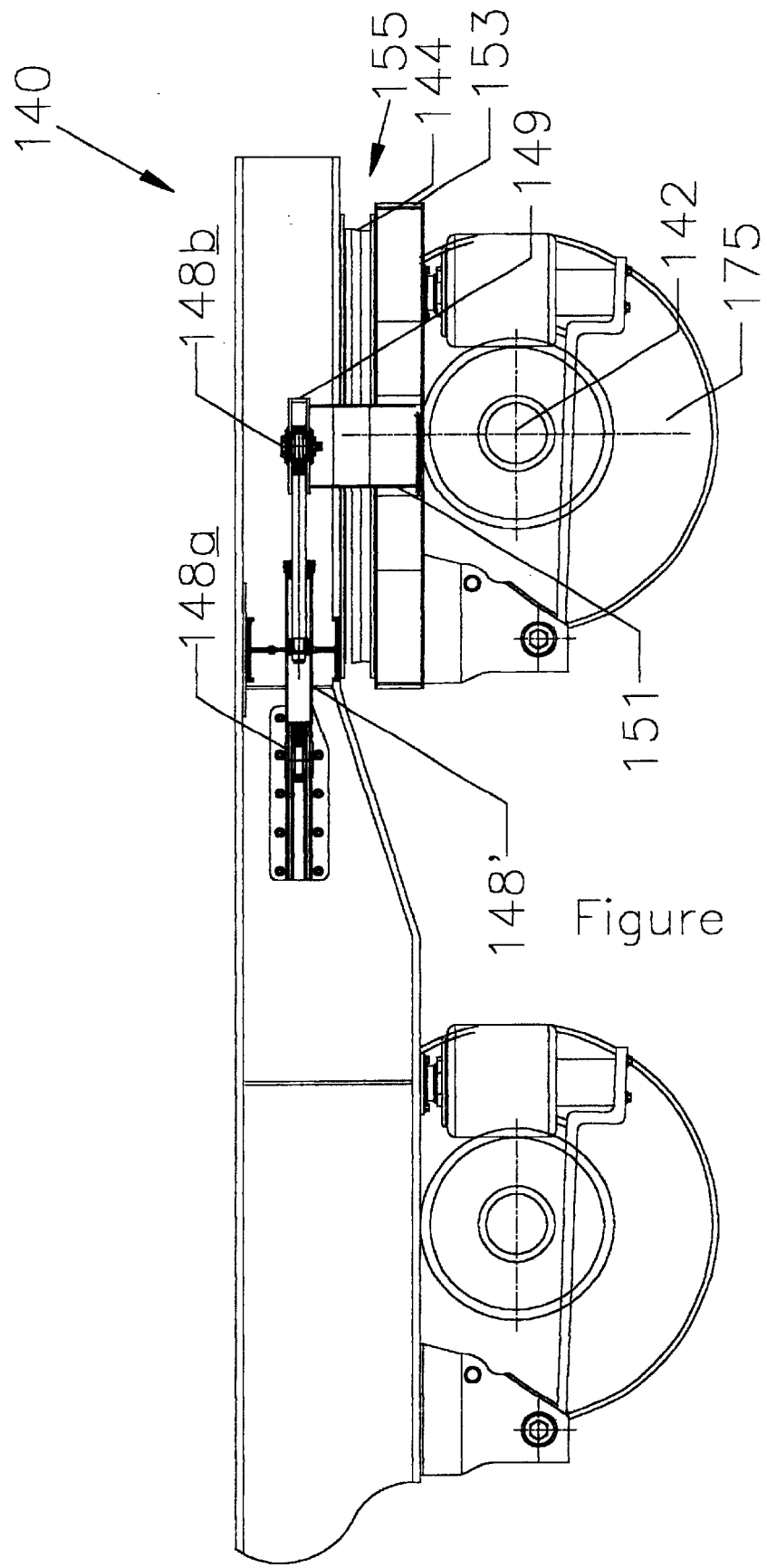
FIG. 10 is a longitudinal vertical sectional view through the centre line of a chassis of a steerable rear axle of a first embodiment of a drive vehicle/trailer unit assembly according to a second aspect of the invention.

FIG. 10 illustrates one slave cylinder 148, whose cylinder end anchor 148a is pivotably mounted, using a spherical bearing, to the chassis of the trailer unit 140 and whose rod end anchor 148b is pivotably mounted to the top plate 149 of the bogie assembly 155. It will be observed that the chassis has a reduced depth adjacent the rear axle 142, to accommodate the depth of the rear turntable 144 and of the bogie 153. It will be observed that the pivotable axis of the rod end anchor 148b is off-set from the pivotable axis of the rear axle 142 by about 33 mm, to produce a castor effect.

Figure 11:
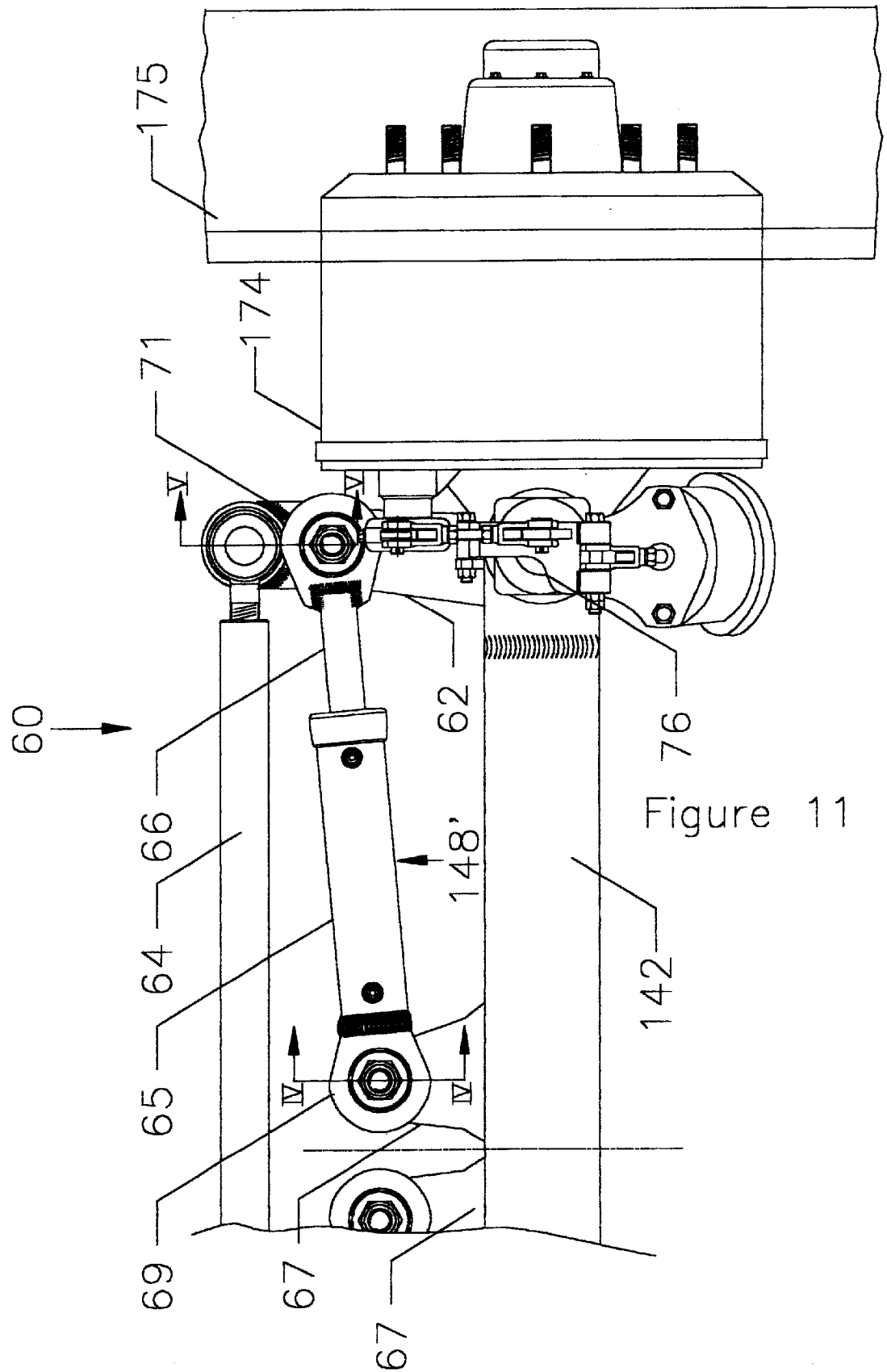
FIG. 11 is a partial plan view of a steerable rear axle of a second embodiment of a drive vehicle/trailer unit assembly according to a second aspect of the invention.
Figure 12:
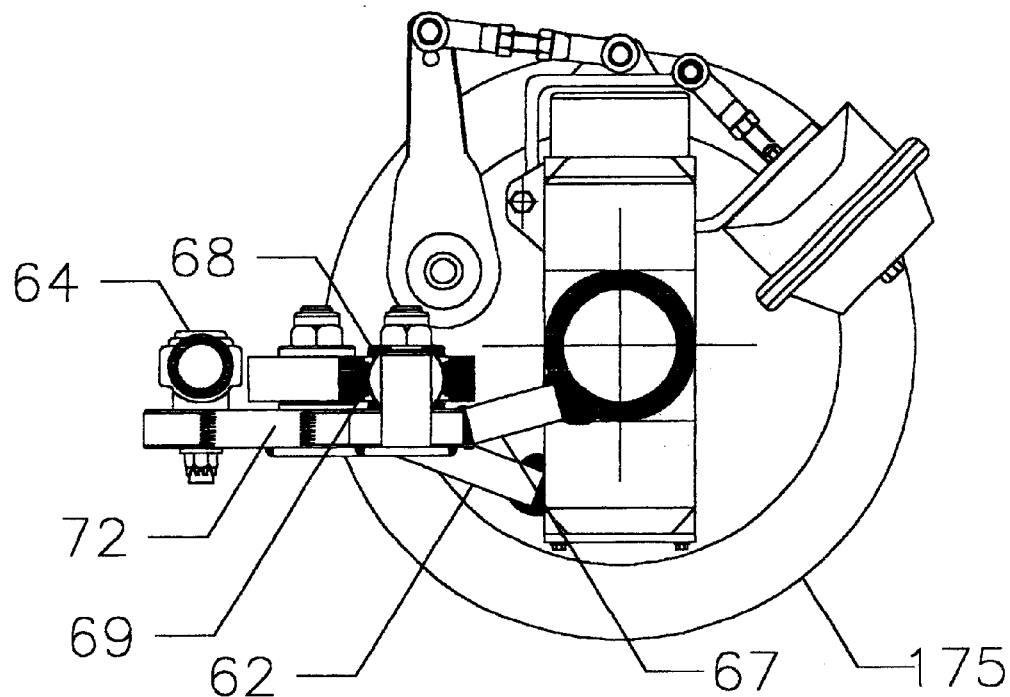
FIGS. 12 and 13 are sectional views along lines IV—IV and V—V as illustrated in FIG. 11.
Figure 13:
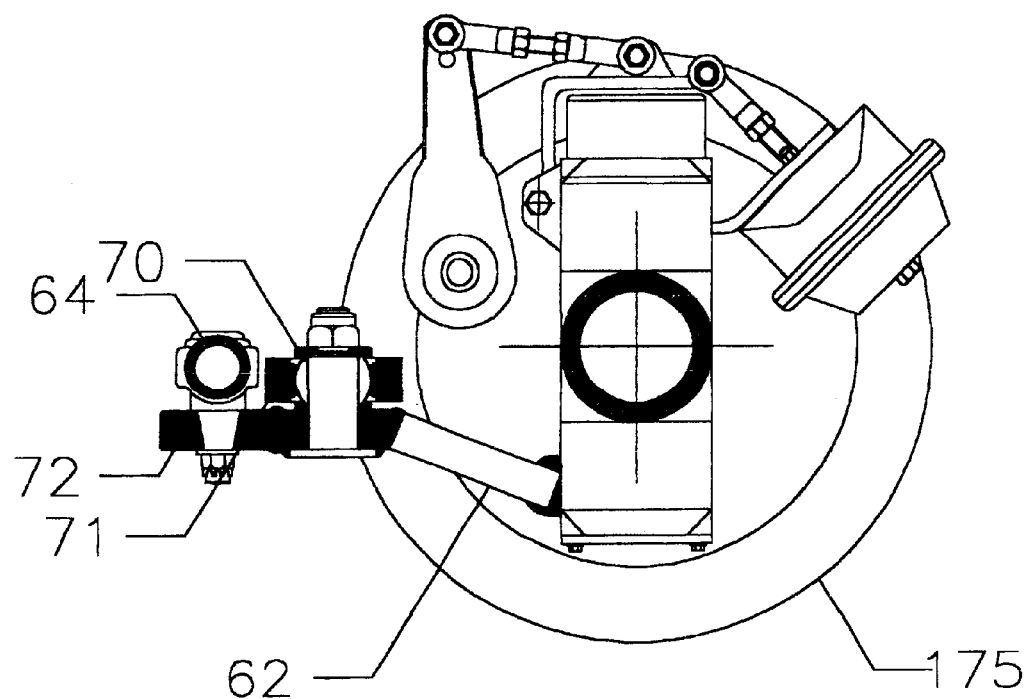

Referring now to FIGS. 11–13 of the accompanying drawings, there is illustrated a second embodiment of a drive vehicle 138/trailer unit 140 assembly having a steerable rear axle 142. A king pin steering system generally indicated as 60 is provided in operative association with the rear axle 142. The king pin steering system comprises a pair of track arms 62 and a track rod 64, the steerable wheel axle 142, track arms 62 and track rod 64 forming a trapezium-shape.

A pair of slave cylinders 148,148'(only 148' visible in FIGS. 11–13) are provided in operative association between the rear axle 142 and each track arm 62. Each slave cylinder 148,148' comprises a cylinder 65 and rod 66.

Referring now to FIG. 12 of the accompanying drawings, a bracket 67 extends between the rear axle 142 and the cylinder 65 of the slave cylinder 148'. Specifically, the cylinder 65 is connected by means of a spherical bearing 68/cylinder 65 end anchor acting as a bush housing 69 to the bracket 67, thereby allowing movement in all directions of the cylinder 65 relative to the bracket 67.

Referring now to FIG. 13 of the accompanying drawings, the rod 66 of each slave cylinder 148' is connected to a respective track arm 62 by means of a spherical bearing 70/rod 66 end anchor acting as a bush housing 71, thereby permitting movement of the rod 66 in all directions relative to the track arm 62. A track rod base member 72 is welded to each track arm 62 and the track rod 64 is fixedly mounted in the track rod base member 72.

It will be appreciated that the rods of the respective master cylinders (not shown) are connected to the distal ends of the crank 12 (not shown). This causes reciprocal movement of the rods 66 of the slave cylinders 148,148', into, and out of, the respective cylinders 65 of the slave cylinders 148,148'. This is, in turn, converted into pivotable movement of the steerable rear wheels 175 (only one partially visible in FIG. 11) about respective king pins 76 (only one visible in FIG. 11).

It will be appreciated that the use, in parallel, of a pair of master cylinders 46,46' and a pair of slave cylinders 148,148' each in operative association with a respective track arm 62 is preferred for safety reasons. However, the trailer unit 140 would still be steerable if only one of the pair of master and slave cylinder combinations were operational, because of the mechanical interconnection of the respective track arms 62 by the track rod 64.

The relative durations of the first and second phases can be altered, as desired, by altering the geometric proportions of the obround section 30 and the elliptic section 32 of the crank 12. The maximum first phase steer angle can also be altered as desired by altering the length of the transverse arms 28,29 of the crank 12. Specifically, it may be desirable to reduce the distance between points of contact of the master cylinders 46,46' with the transverse arms 28,29 of the crank 12 from 876 mm to 536 mm.

It will be appreciated that the use of a king pin type rear axle 142 eliminates the need for a pivotable rear turntable 44 and bogie assembly 55, thus reducing production time and, possibly, production costs. In addition, it eliminates the service requirement associated with pivotable rear turntables 44/bogie assemblies 55.

It will also be appreciated that the use of the king pin system permits a constant chassis depth from front to back. In contrast, the use of a pivotable rear turntable 44/bogie assembly 55, requires a reduction in chassis depth of the order of 200 mm, namely, the combined thickness of the turntable 44 and the bogie 53. Such a reduction in chassis depth increases the internal stress in the chassis, the increase in stress being inversely proportional to the degree of reduction in depth of the chassis. The effect of this increased stress is more relevant in a chassis made from aluminum and, also in a tippable chassis where the total mass is pivoted about a point which lies within the reduced depth area, thereby increasing the possibility of failure. It will be appreciated that the use of a king pin type axle would eliminate these problems.

A linkage mechanism according to the present invention, by careful geometric design, optimises the steering angle on the at least one pair of steerable rear wheels 74,174 engendered by the relative angle between the drive vehicle 38 and the trailer unit 40. This resultant optimisation effect is more pronounced at small relative angles and enables rapid manoeuvring of the drive vehicle 38/trailer unit 40 assembly in confined spaces.

It will be appreciated that the linkage mechanism of the present invention would also be suitable for operative association between, for example, a king pin steering system of a four-wheel drive vehicle and the steerable rear wheels of such a vehicle.

What is claimed is:

1. A linkage mechanism for operative association between a fifth wheel of a drive vehicle and at least one pair of steerable rear wheels, the linkage mechanism comprising:
    a pivotable crank;
    a cam roller in operative association with the fifth wheel; and
    a cam collar in operative association with the crank, the cam collar comprising a substantially obround section opening into a substantially elliptic second and the cam roller engaging against the obround section in the first phase and against the elliptic section in the second phase,
    wherein the linkage mechanism is arranged so as, in a first phase, to convey rotary movement of the fifth wheel to steering movement of the at least one pair of steerable rear wheels and, in a second phase, to permit further rotary movement of the fifth wheel substantially without further steering movement of the at least one pair of steerable rear wheels.

2. A linkage mechanism according to claim 1, in which a stop means is arranged to substantially prevent further pivotable movement of the crank in the second phase.

3. A linkage mechanism according to claim 1, in which the crank and the cam collar form a unitary bell crank.

4. A linkage mechanism according to claim 3, in which the bell crank is substantially "T"-shaped.

5. A vehicle having at least one pair of steerable rear wheels and incorporating a linkage mechanism for operative association between a fifth wheel of a drive vehicle and the at least one pair of steerable rear wheels, the linkage mechanism comprising:
    a pivotable crank;
    a cam roller in operative association with the fifth wheel; and
    a cam collar in operative association with the crank, the cam collar comprising a substantially obround section opening into a substantially elliptic section and the cam roller engaging against the obround section in the first phase and against the elliptic section in the second phase,
    wherein the linkage mechanism is arranged so as, in a first phase, to convey rotary movement of the fifth wheel to steering movement of the at least one pair of steerable rear wheels and, in a second phase, to permit further rotary movement of the fifth wheel substantially without further steering movement of the at least one pair of steerable rear wheels.

6. A vehicle according to claim 5, in which the vehicle comprises an assembly of the drive vehicle and a trailer unit, the trailer unit including the at least one pair of steerable rear wheels.

7. A vehicle according to claim 5, in which pivotable movement of the crank is conveyed to the at least one pair of steerable rear wheels by a hydraulic means.

8. A vehicle according to claim 5, in which a stop means is arranged to substantially prevent further pivotable movement of the crank in the second phase.

9. A vehicle according to claim 5, in which the crank and the cam collar form a unitary bell crank.

10. A vehicle according to claim 5, in which the crank and the cam collar form a unitary bell crank and pivotable movement of the unitary bell crank is conveyed to the at least one pair of steerable rear wheels by a hydraulic means.

11. A vehicle according to claim 10, in which the bell crank is substantially "L"-shaped and the hydraulic means comprises a master hydraulic cylinder in fluid communication with a slave hydraulic cylinder.

12. A vehicle according to claim 10, in which the bell crank is substantially "T"-shaped and the hydraulic means comprises two master cylinders, each in fluid communication with a respective slave cylinder.

13. A vehicle according to claim 5, in which pivotable movement of the crank is conveyed to the at least one pair of steerable rear wheels by mechanical means.

14. A vehicle according to claim 13, in which the mechanical means comprises one of linkage rods and wire ropes.

* * * * *